(12) United States Patent
Arends et al.

(10) Patent No.: US 11,445,357 B1
(45) Date of Patent: Sep. 13, 2022

(54) CALL ROUTING WHILE ROAMING ON A 5G WIRELESS TELECOMMUNICATION NETWORK

(71) Applicant: T-Mobile USA, Inc., Bellevue, WA (US)

(72) Inventors: Joel Arends, Renton, WA (US); Nassereddine Sabeur, Bellevue, WA (US); Raymond Ball, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 13 days.

(21) Appl. No.: 17/193,848

(22) Filed: Mar. 5, 2021

(51) Int. Cl.
*H04W 8/12* (2009.01)
*H04W 40/20* (2009.01)
*H04L 101/65* (2022.01)

(52) U.S. Cl.
CPC ............ *H04W 8/12* (2013.01); *H04W 40/20* (2013.01); *H04L 2101/65* (2022.05)

(58) Field of Classification Search
None
See application file for complete search history.

(56) References Cited

U.S. PATENT DOCUMENTS

| | | | |
|---|---|---|---|
| 5,555,553 A | 9/1996 | Jonsson | |
| 5,557,606 A * | 9/1996 | Moon | H04W 84/08 455/445 |
| 6,075,783 A | 6/2000 | Voit | |
| 6,876,855 B1 * | 4/2005 | Howe | H04M 15/49 455/445 |
| 7,187,923 B2 | 3/2007 | Mousseau et al. | |
| 8,041,335 B2 | 10/2011 | Khetawat et al. | |
| 8,165,572 B1 | 4/2012 | Kirchhoff et al. | |
| 8,346,216 B2 | 1/2013 | Osborn | |
| 8,611,880 B2 * | 12/2013 | Noldus | H04W 8/28 370/395.2 |
| 8,768,351 B2 | 7/2014 | Moore et al. | |
| 9,137,770 B2 | 9/2015 | Edge et al. | |
| 9,184,978 B2 | 11/2015 | Ewert et al. | |
| 9,380,514 B2 | 6/2016 | Duroux et al. | |
| 9,706,048 B2 | 7/2017 | Russell | |
| 10,064,043 B2 | 8/2018 | Lau et al. | |
| 10,231,109 B2 | 3/2019 | Lauster | |
| 10,382,931 B2 | 8/2019 | Lauster | |
| 11,032,427 B1 * | 6/2021 | Lowman | H04L 67/12 |
| 2002/0075846 A1 | 6/2002 | Valentine et al. | |
| 2002/0080751 A1 | 6/2002 | Hartmaier | |
| 2004/0058709 A1 | 3/2004 | Zabawskyj et al. | |
| 2005/0064855 A1 | 3/2005 | Russell | |

(Continued)

*Primary Examiner* — Kenny S Lin
(74) *Attorney, Agent, or Firm* — Perkins Coie LLP

(57) ABSTRACT

Disclosed is a system and method to route a call from a roaming UE on a 5G network. The system receives from a UE belonging to a home network an indication of a call to a dialed number. The call requires information associated with the UE that is not available to the first wireless telecommunication network, because the UE is roaming on a visitor network. The indication of the call includes a unique identifier of the visitor network. The system can determine based on the unique identifier that the UE is roaming and send a request to the visitor network to provide instructions on how to route the received call. Upon obtaining the instructions on how to route the received call, the system routes the received call.

20 Claims, 5 Drawing Sheets

(56) References Cited

U.S. PATENT DOCUMENTS

| | | |
|---|---|---|
| 2005/0159153 A1 | 7/2005 | Mousseau et al. |
| 2005/0181805 A1* | 8/2005 | Gallagher ............. H04W 88/06 |
| | | 455/456.1 |
| 2005/0186948 A1* | 8/2005 | Gallagher ............. H04W 88/06 |
| | | 455/414.1 |
| 2005/0192009 A1 | 9/2005 | Shaheen et al. |
| 2005/0233733 A1 | 10/2005 | Roundtree et al. |
| 2005/0250519 A1 | 11/2005 | Samuel |
| 2009/0131024 A1 | 5/2009 | Osborn |
| 2009/0264095 A1 | 10/2009 | Khetawat et al. |
| 2013/0310029 A1* | 11/2013 | Edwards ................. H04W 8/12 |
| | | 455/433 |
| 2013/0331096 A1* | 12/2013 | Rogan .................... H04W 8/12 |
| | | 455/433 |
| 2014/0087725 A1 | 3/2014 | Moore et al. |
| 2014/0273927 A1* | 9/2014 | Trapp ................... H04M 15/50 |
| | | 455/406 |
| 2015/0141022 A1 | 5/2015 | Duroux et al. |
| 2017/0163803 A1 | 6/2017 | Russell |
| 2017/0237860 A1* | 8/2017 | Mumick ............... H04W 4/025 |
| | | 455/417 |
| 2017/0366955 A1* | 12/2017 | Edge ....................... H04W 4/90 |
| 2017/0374107 A1 | 12/2017 | Lauster |
| 2017/0374695 A1 | 12/2017 | Lau et al. |
| 2018/0007587 A1* | 1/2018 | Feldman ............... H04W 36/18 |
| 2018/0049010 A1 | 2/2018 | Lauster |
| 2018/0160291 A1* | 6/2018 | Burgert ................... H04W 8/06 |
| 2019/0281506 A1* | 9/2019 | Chiang ................... H04W 8/26 |
| 2020/0145896 A1* | 5/2020 | Mishra ................... H04W 40/02 |
| 2020/0177641 A1* | 6/2020 | Wikoff ............... H04L 65/1033 |

* cited by examiner

CALL ROUTING WHILE ROAMING ON A 5G WIRELESS TELECOMMUNICATION NETWORK

BACKGROUND

In telecommunications, 5G is the fifth-generation technology standard for broadband cellular networks, which cellular phone companies began deploying worldwide in 2019, and is the planned successor to the 4G networks which provide connectivity to most current cellphones. 5G networks are predicted to have more than 1.7 billion subscribers worldwide by 2025, according to the GSM Association. Like its predecessors, 5G networks are cellular networks, in which the service area is divided into small geographical areas called cells. All 5G wireless devices in a cell are connected to the internet and telephone network by radio waves through a local antenna in the cell. The main advantage of the new networks is that they will have greater bandwidth, providing higher download speeds, eventually up to 10 gigabits per second (Gbit/s). Due to the increased bandwidth, it is expected the networks will not only exclusively serve cellphones like existing cellular networks but will also be used as general internet service providers for laptops and desktop computers, competing with existing ISPs such as cable internet, and also will make possible new applications in internet of things (IoT) and machine-to-machine areas. 4G cellphones are not able to use the new networks, which require 5G-enabled wireless devices.

The current specification for a roaming user equipment (UE) on a 5G network does not include a mechanism for the home network to understand the location details of the UE to be able to route the call based on those location details.

DETAILED DESCRIPTION

Disclosed here is a system and method to route a location-dependent call, such as a call to a short code number, from a user equipment (UE) roaming on a 5G network. To route the call, the system can receive from the UE belonging to a home wireless telecommunication network to which the UE is subscribed, an indication of a call to a telephone number, such as a short code telephone number 211, 311, 411, etc. The UE placing the call can roam on a visitor wireless telecommunication network. Routing the call can require information about a geographic location of the UE, but the location of the UE is not available to the home wireless telecommunication network, because the UE is communicating with the visitor telecommunication network. For example, when a UE calls a short code such as 411 from Seattle, and when a UE calls 411 from Palo Alto, the UE is calling two different 10-digit phone numbers. Earlier generations of wireless telecommunication technologies, such as 4G and lower, enable the home network to route a call that is dependent on the location of the UE, but the 5G standard is missing the feature. The disclosed system modifies the 5G network to resolve location-specific phone numbers when the UE is roaming. The system can use NRF-to-NRF communication, which is part of the 5G standard, to resolve location-based phone numbers. The system creates a chain of communication between the home telecommunication network and the visitor telecommunication network, enabling the home telecommunication network to place the call without knowing the location of the UE.

Figure 1:
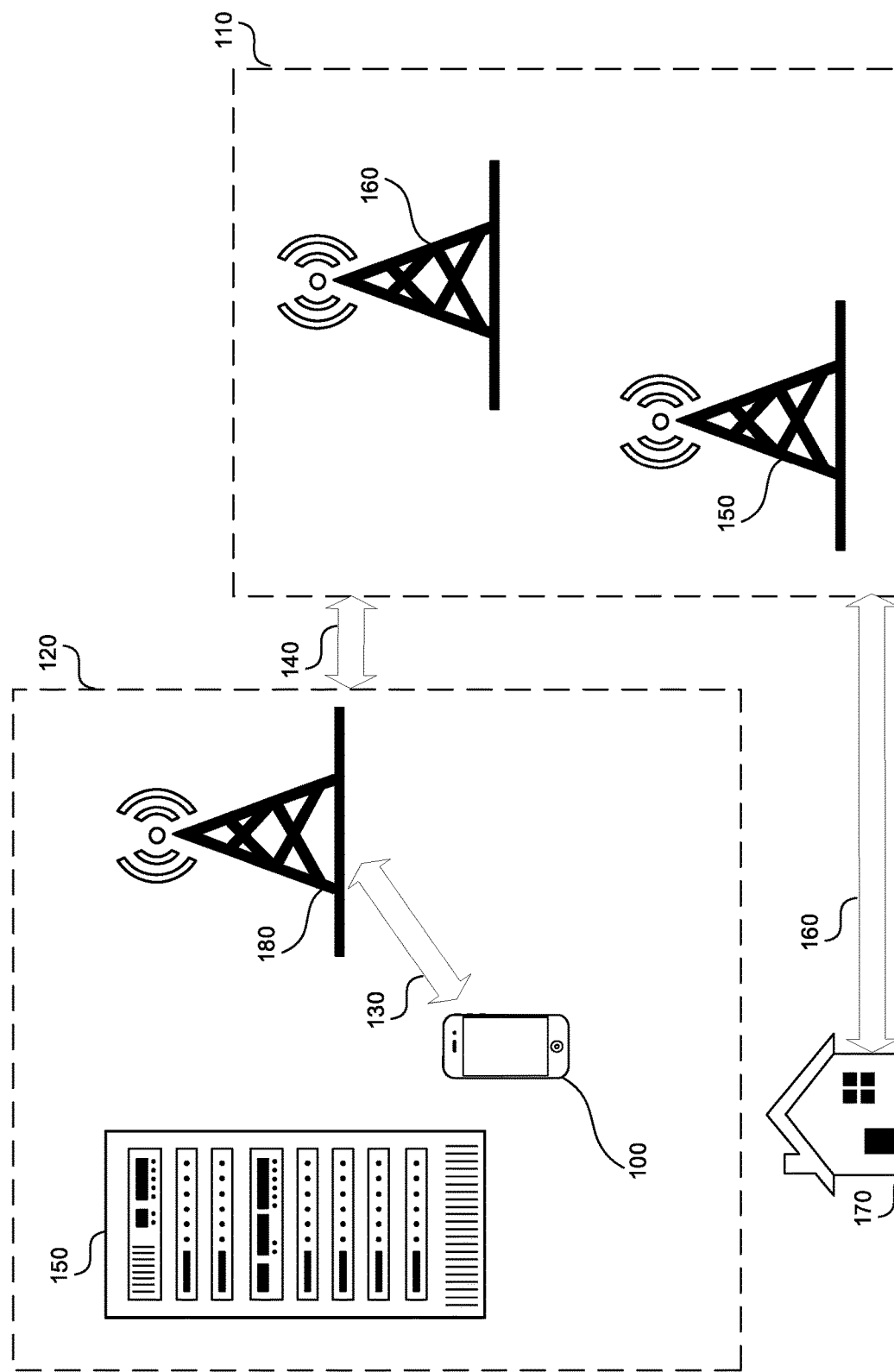
FIG. 1 shows the UE roaming on the second telecommunication network.

FIG. 1 shows the UE roaming on the second telecommunication network. The UE 100 can be a subscriber of the first telecommunication network 110, the home network. The UE 100 can be a cell phone, a vehicle, a personal digital assistant, wearable device, vehicle or any device connected to the first telecommunication network 110. However, the UE placing the call can roam on a second wireless telecommunication network 120, the visitor network. For example, the UE 100 can be a T-Mobile subscriber that is using the AT&T network to place the call because T-Mobile does not have cell sites in the region where the UE 100 is located. The home network 110 and the visitor network 120 can be 5G wireless telecommunication networks or higher.

When the UE 100 is roaming, and the visitor network 120 receives the call 130, the visitor network 120 sends an indication 140 of the call to the home network 110. However, completing the call can require information about a location of the UE. For example, the call can be an N11 short code such 211, 311, 411, 511, 611, 711, 811, *210, #210, except 911, whose corresponding 10-digit or 11-digit number, for example, a translated number, depends on the location of the UE 100. In a more specific example, if a person dials 511 to seek road and weather information, the call should be routed to the nearest 511 station capable of providing local road and weather information. To determine the nearest 511 station, the home network 110 needs to know the location of the UE 100.

The location of the UE 100 is not available to the first wireless telecommunication network 110 because the UE is communicating with the visitor telecommunication network 120. The indication 140 of the call sent to the home network 110 can include a unique identifier of a cell site 180 communicating directly with the UE 100.

The unique identifier of the cell site 180 can be a part of Cell Global Identity (CGI) which is a globally unique identifier for a Base Transceiver Station in mobile phone networks. CGI consists of four parts: Mobile Country Code (MCC), Mobile Network Code (MNC), Location Area Code (LAC) and Cell Identification (CI). CGI is an integral part of 3GPP specifications for mobile networks, for example, for identifying individual base stations to "handover" ongoing phone calls between separately controlled base stations, or between different mobile technologies. MCC and MNC make up a PLMN identifier, and PLMN and LAC make up a location area identity (LAI), which uniquely identifies a Location Area of a given operator's network. A CGI can be seen as a LAI with added Cell Identification (CI), to further identify the individual base station of that Location Area.

The home network 110 can determine, based on the unique identifier of the cell site, that the UE 100 is roaming and an identifier (ID) of the visitor network 120. For example, the home network 110 can determine the ID of the visitor network 120 based on LAI contained in the CGI.

Based on the ID of the visitor network 120, the home network 110 can send a request to the visitor network 120 asking for a unique address of a node 150 in the second wireless telecommunication network configured to provide instructions on how to route the received call. Upon receiving the unique address of the node 150, the home network 110 can request instructions on how to route the received call 140 from the node 150.

The home network 110 can obtain the instructions on how to route the received call and, based on the instructions, route the received call. For example, if the placed call is 411, the call can be routed via communication link 160 to a directory assistance station 170 close to the UE 100. In another example, if the placed call is a short code for traffic information, the call can be routed to a center having traffic information surrounding the location of the UE 100.

Figure 2:
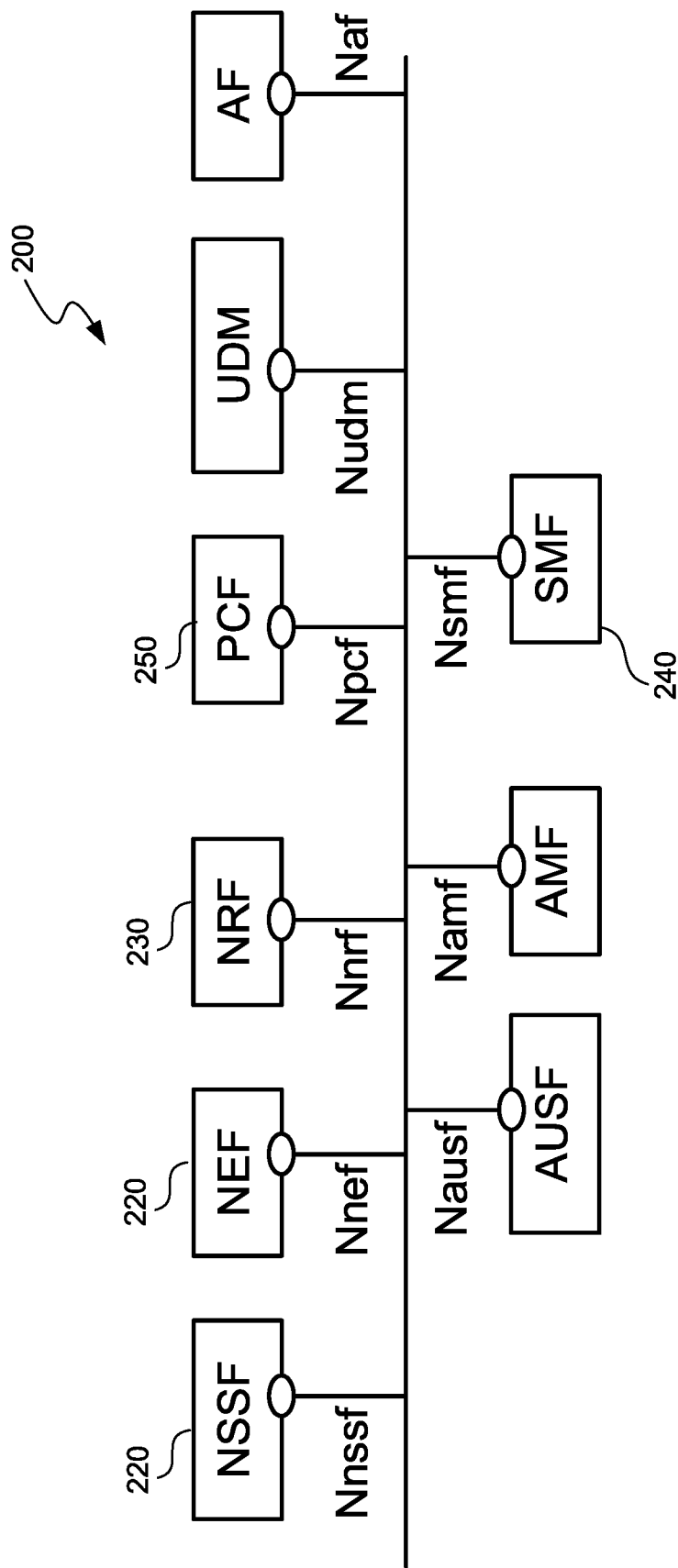
FIG. 2 shows some of the network nodes in a 5G wireless telecommunication network.

FIG. 2 shows some of the network nodes in a 5G wireless telecommunication network. The 5G System (5GS) architecture separates the 5G Core Network (5GC) into Control Plane (CP) and User Plane (UP) networks. The 5GC CP is a network 200 including a 5G NR core network node including network function (NF) elements, for example, network nodes (nodes) 210, 220, 230, 240, 250 (only five labeled for brevity) that act as consumers 240 and/or producers 250 of services. This Service Based Architecture (SBA) adheres to a RESTful architecture paradigm mandating NF elements, for example, nodes 210, 220, 230, 240, 250 to expose service application programmer interfaces (APIs).

The Network Repository Function (NRF) node 230 is a key component of the 5G SBA and is not part of any earlier telecommunication standard such as 4G, 3G, 2G, etc. The NRF node 230 maintains an updated repository of all the 5G elements available in the operator's network along with the services provided by each of the elements in the 5G core that are expected to be instantiated, scaled, and terminated with minimal or without manual intervention. In addition to serving as a repository of the services, the NRF node 230 also supports discovery mechanisms that allow 5G elements to discover each other and get the updated status of the desired elements. The NRF supports the following functions: maintain the profiles of the available NF instances and their supported services in the 5G core network; allow consumer NF instances to discover other providers NF instances in the 5G core network; and allow NF instances to track the status of other NF instances. In other words, the NRF node 230 can discover the NRF nodes of other 5G telecommunication networks, from which the NRF node 230 of the home network 110 in FIG. 1 can obtain information from the visitor network 120 in FIG. 1.

Figure 3:
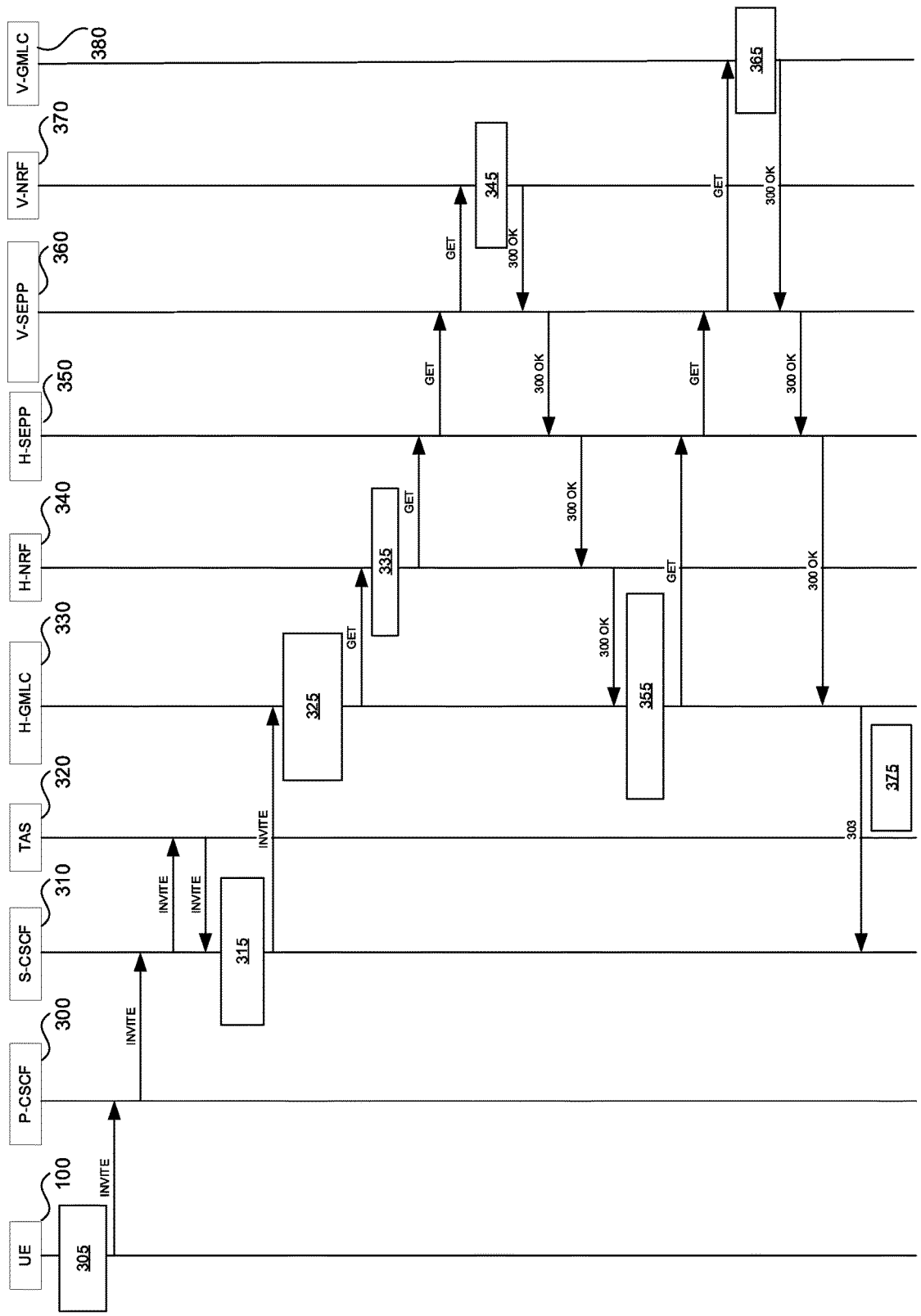
FIG. 3 shows how the call is routed from the visitor network to the home network.

FIG. 3 shows how the call is routed from the visitor network to the home network. The nodes 300, 310, 320, 330, 340, and 350 belong to the home network 110 in FIG. 1. The nodes 360, 370, and 380 belong to the visitor network 120 in FIG. 1. In step 305, the roaming UE 100 dials a number requiring location services. The node 300 S-CSCF receives the indication of the call. S-CSCF is a Serving-Call Session Control Function. The S-CSCF is the primary node in the Internet Protocol Multimedia Subsystem (IMS) responsible for session control.

The indication of the call includes the number dialed and the CGI. The node 300 in step 315 sends the CGI and the number dialed to Gateway Mobile Location Centre (GMLC) 310 to determine the final number to dial based on location. The GMLC contains functionality required to support location-based service (LBS). GMLC includes a database of latitudes and longitudes of cell site IDs.

The GMLC 310 can receive the CGI. In addition to containing the ID of the visitor network 120, the CGI contains the ID of the cell site 180 in FIG. 1 in direct communication with the UE 100. Based on the ID of the visitor network 120 in FIG. 1, and/or the ID of the cell site 180, the GMLC 310 can determine that the UE 100 is roaming, because the ID of the cell site 180 is unknown to the GMLC 310, and/or the network ID is unknown to the GMLC 310.

Upon determining that the UE 100 is roaming, the GMLC 310, in step 325 can request service discovery for a visited GMLC via a local Network Repository Function (NRF) 320. NFR is related to the 3GPP 5G Architecture. NRF supports the service discovery function. As such, NRF 320 is able to receive an NRF Discovery Request from an NRF instance and can provide information about discovered NRF 320 instances.

The NRF 340, in step 335, can query the visitor NRF nodes 370 via SEPP 350, 360 for an address of a GMLC of the visitor network 120. The Security Edge Protection Proxy (SEPP) enables a secure interconnect between 5G networks 110, 120. The SEPP ensures end-to-end confidentiality and/or integrity between the home and visitor networks 110, 120 for all 5G interconnect roaming messages.

The visitor NRF node 370 belongs to the visitor network 120 and, in step 345, can respond to the home NRF nodes 340 with the Fully Qualified Domain Name (FQDN) of the visitor GMLC 380. FQDN is a unique address of the GMLC 380, akin to an Internet Protocol (IP) address, in the visitor network 120.

Upon receiving the FQDN of the visitor GMLC 380, the GMLC 330 of the home network 110, in step 355, can directly query the GMLC 380 of the visitor network 120 and request the translated number based on the call number received from the UE 100 using Ngmlc_RouteInfo. For example, if the call number received from the UE is a short code such as a three-digit number, the three-digit number is not a routable number. To place the call based on the three-digit number, the wireless telecommunication network needs to know the translated number, for example, a routing number having 10 or 11 digits. The translation between the three-digit number and the routing number can depend on the location of the UE 100.

For example, the UE 100 can dial a service providing a weather forecast. The phone number of the service can vary because the service can have multiple phone numbers providing information for multiple locations. The UE 100 is not expected to know the phone number depending on the location, and the service can provide a general phone number that the user can dial regardless of the UE's location. However, the translation between the general phone number and the appropriate weather forecasting service can be done by the telecommunication network.

In step 365, the GMLC 380 sends the routing number to the home network 110. The GMLC 380 can determine the routing number based on the unique ID of the cell site 180 in FIG. 1 contained in the CGI. The GMLC 380 can triangulate the location of the UE 100, and, based on the original number dialed and the location of the UE, the GMLC 380 can determine the appropriate number to dial. The GMLC 380 has a lookup table that maps short codes to routing numbers. If the original number dialed is supported by GMLC 380, the lookup table contains the mapping between the original number dialed and the routing number. The GMLC 380 can determine the routing number by looking up the table based on the short code dialed. If the original number dialed is not supported by GMLC 380, the GMLC can resolve the short code by reaching outside of visitor the network to obtain the routing number. Finally, the home GMLC 330, in step 375, provides the routing number to the home network 110 in a contact header.

If the UE 100 was not roaming, communication with nodes 360, 370, 380 would not be necessary. Specifically, once is the GMLC 330 receives the CGI associated with the call, the home GMLC 330 can determine the routing number without communicating with the nodes 360, 370, 380 of the visitor network 120.

Figure 4:
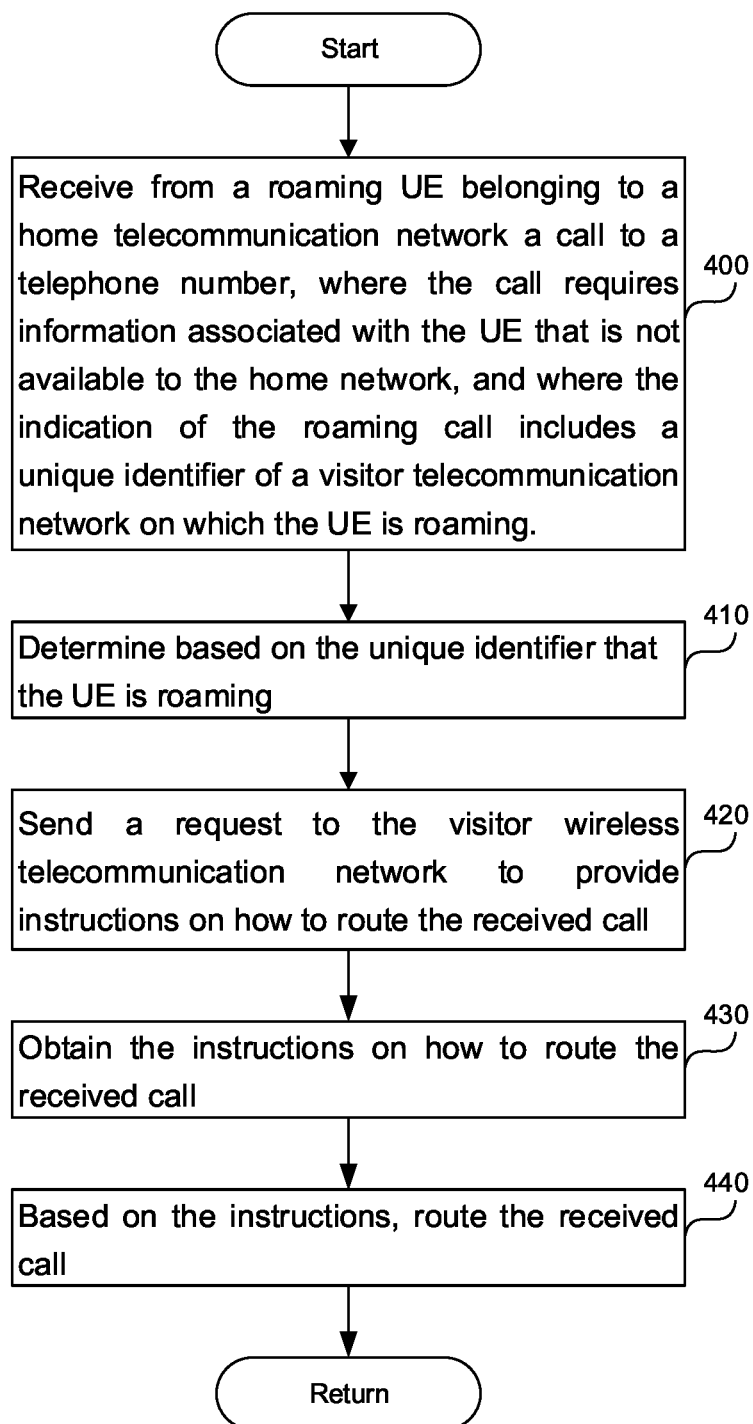
FIG. 4 is a flowchart of a method to route a call from a UE on a 5G network or higher.

FIG. 4 is a flowchart of a method to route a call from a roaming UE on a 5G network or higher. In step 400, a hardware or software processor executing instructions described in this application receives from a UE belonging to a first wireless telecommunication network, an indication of a call to a dialed first telephone number. The first wireless telecommunication network can be the home network. The first telephone number can be a short code, such as 411, 511, that is location-specific. The call can require information associated with the UE that is not available to the first wireless telecommunication network. For example, the call can require a location of the UE to be completed, and the location of the UE may not be available to the first wireless telecommunication network because the UE is roaming on a second wireless telecommunication network, for example, a visitor network. The first wireless telecommunication network and the second wireless telecommunication network are 5G networks or higher. For example, the first and second wireless telecommunication networks can be 5G, or 6G, but not LTE, 4G, 3G, etc.

The indication of the call can include a unique identifier associated with the second telecommunication network and/or a unique identifier of a cell site communicating directly with the UE. For example, the indication of the call can include CGI and the first telephone number.

In step 410, the processor determines the UE is roaming, e.g. based on the unique identifier. For example, the processor can query a database of addresses associated with the first telecommunication network to see if the unique identifier is included. If the unique identifier is not included in the database, the processor determines that the UE is roaming.

In step 420, the processor sends a request to the second 5G wireless telecommunication network to provide instructions on how to route the received call.

In step 430, the processor obtains the instructions on how to route the received call. In one embodiment, the instructions can include the routable number. The processor of the home network can send a first request to the second 5G wireless telecommunication network for a unique address of a node in the second wireless telecommunication network configured to provide instructions on how to route the received call. Specifically, the node can be the GMLC of the second telecommunication network including a database of latitudes and longitudes of the cell site IDs. Upon receiving the address, the processor can send a second request to the node having the unique address to provide a routable number based on the first telephone number. The processor can obtain the routable number and call the routable number. The routable number can be a 10- or 11-digit number that can be called without the knowledge of the location of the UE. In other words, the routable number can be a second phone number based on the first telephone number and the location of the UE.

In the above embodiment, to request the routable number, the processor can send the CGI to the GMLC of the visitor network. The CGI can include a cell identification (CI) of a cell site directly in communication with the UE. Based on the CI, the GMLC of the visitor network can determine the location of the UE and/or the routable number. For example, a CGI (e.g. 001-02-3-4) includes:
a LAI (001-02-3), which consists of:
  a PLMN (001-02), which consists of:
    MCC (001)
    MNC (02)
  and a LAC (03),
and a CI (4).

In the above embodiment, to obtain the instructions, the processor obtains the address of the GMLC of the visitor network. To obtain the address of the GMLC of the visitor network, the processor can send the request by a first network repository function (NRF) associated with the first wireless telecommunication network to a second NRF associated with the second wireless telecommunication network. This type NRF-to-NRF communication is unique to a 5G network and does not require a special agreement between the two networks to provide GMLC information to each other. NRF-to-NRF communication can be used to discover other network functions besides GMLC. For example NRF-to-NRF communication can be used to discover UDM, SMF, AUSF, and PCF.

In step 440, based on the instructions, the processor can route, for example, place, the received call.

Computer

Figure 5:
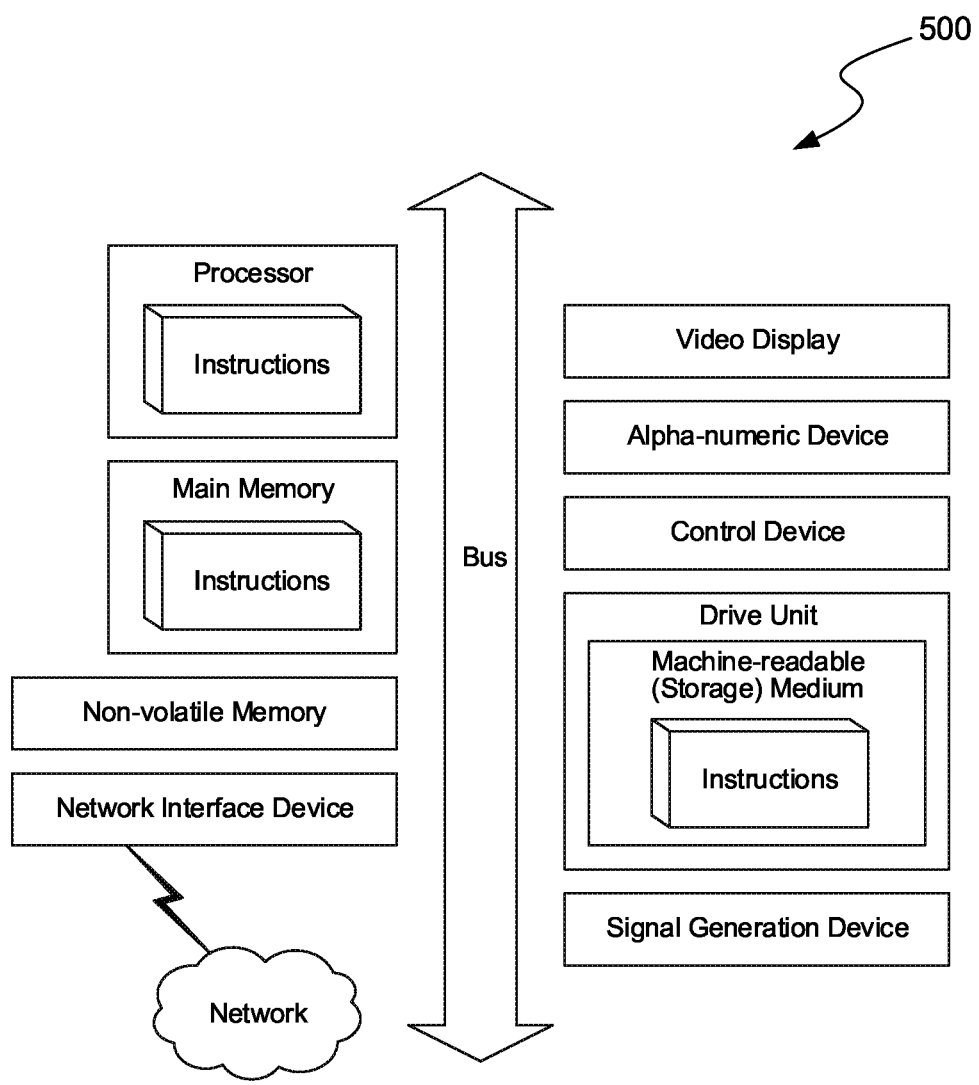
FIG. 5 is a diagrammatic representation of a machine in the example form of a computer system within which a set of instructions, for causing the machine to perform any one or more of the methodologies or modules discussed herein, can be executed.

FIG. 5 is a diagrammatic representation of a machine in the example form of a computer system 500 within which a set of instructions, for causing the machine to perform any one or more of the methodologies or modules discussed herein, can be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the examples of FIGS. 1-4 (and any other components described in this specification) can be implemented. The computer system 500 can be of any applicable known or convenient type. The components of the computer system 500 can be coupled together via a bus or through some other known or convenient device.

The processor of the computer system 500 can execute instructions described in this application, such as instructions described in FIG. 4. The processor of the computer system 500 can be associated with the home network 110 in FIG. 1, the visitor network 120 in FIG. 1, and/or the UE 100 in FIG. 1. The main memory, the non-volatile memory, and/or the drive unit can store the instructions described in this application. The visitor network 120, the home network 110, and the UE 100 can communicate with each other using the network of the computer system 500.

This disclosure contemplates the computer system 500 taking any suitable physical form. As example and not by way of limitation, computer system 500 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 can include one or more computer systems 500; be unitary or distributed; span multiple locations; span multiple machines; or reside in a cloud, which can include one or more cloud components in one or more networks. Where appropriate, one or more computer systems 500 can perform without substantial spatial or temporal limitation one or more steps of one or more methods described or illustrated herein. As an example and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the machine and that cause the machine to perform any one or more of the methodologies or modules of the presently disclosed technique and innovation.

In some circumstances, operation of a memory device, such as a change in state from a binary one to a binary zero or vice versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device can comprise a transformation, such as a physical transformation. Rather, the foregoing are intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. At least one computer-readable medium, excluding transitory signals, and carrying instructions that, when executed by at least one data processor, performs a method to route a call from a mobile device roaming on a 5G network, the method comprising:
   receiving, from the mobile device authorized on a first 5G wireless telecommunication network, an indication of the call to a first telephone number,
      wherein the call requires information about a geographic location of the mobile device for the call to be connected,
      wherein the location of the mobile device is not available to the first wireless telecommunication network,
      wherein the mobile device is roaming on a second 5G wireless telecommunication network when the indication of the call is received,
      wherein the second 5G wireless network is managed by a company different from a company managing the first wireless network, and
      wherein the indication of the call includes a unique identifier of a cell site communicating directly with the mobile device;
   determining based on the unique identifier of the cell site that the mobile device is roaming;
   determining an identifier (ID) of the second 5G wireless telecommunication network based on the unique identifier of the cell site;
   based on the ID of the second 5G wireless telecommunication network, sending a request to the second 5G wireless telecommunication network for a unique address of a node in the second 5G wireless telecommunication network,
      wherein the node in the second 5G wireless telecommunication network is configured to provide instructions on how to route the call;
   obtaining the instructions on how to route the call; and
   based on the instructions and the first telephone number, routing the call.

2. The computer readable medium of claim 1, wherein sending the request to the second 5G wireless telecommunication network for the unique address includes:
   sending the request by a first network repository function (NRF) associated with the first wireless telecommunication network to a second NRF associated with the second 5G wireless telecommunication network.

3. The computer-readable medium of claim 1, wherein the first telephone number is a short code.

4. The computer-readable medium of claim 1, wherein obtaining the instructions on how to route the call further comprises:
   obtaining a second telephone for routing the call number based on the first telephone number and the location of the mobile device.

5. The computer-readable medium of claim 1, wherein the sending of the request to the second 5G wireless telecommunication network includes:
   based on the ID of the second 5G wireless telecommunication network, sending the request to the second 5G wireless telecommunication network for a unique address of a database associated with the second 5G wireless telecommunication network, wherein the database includes a geographic location of the cell site.

6. The computer-readable medium of claim 1, wherein the obtaining of the instructions on how to route the call includes:
   obtaining the location of the mobile device or a location of the cell site.

7. A method, comprising:
   receiving, from a user equipment (UE) registered to a first wireless telecommunication network, an indication of a connection request based on a first telephone number,
      wherein the connection request requires information associated with the UE that is not available to the first wireless telecommunication network,
      wherein the connection request is placed by the UE roaming on a second wireless telecommunication network,
      wherein the indication of the connection request includes a unique identifier associated with the second wireless telecommunication network, and wherein the first wireless telecommunication network and the second wireless telecommunication network are 5G or higher generation wireless network;

determining based on the unique identifier that the UE is roaming in the second wireless telecommunication network;

sending a request to the second wireless telecommunication network to provide instructions on how to complete the connection request;

obtaining the instructions on how to complete the connection request; and based on the instructions, completing the connection request.

8. The method of claim 7, wherein the connection request requires information about a geographic location of the UE to be completed.

9. The method of claim 7, further comprising:

sending a first request to the second 5G wireless telecommunication network for a unique address of a node in the second wireless telecommunication network configured to provide the instructions on how to complete the connection request;

sending a second request to the node having the unique address to provide a routable number based on the first telephone number;

obtaining the routable number; and calling the routable number.

10. The method of claim 7, wherein the indication of the connection request includes a unique identifier of a wireless cell near the UE.

11. The method of claim 7, wherein the first telephone number is a short code.

12. The method of claim 7, wherein the obtaining of the instructions on how to complete the connection request comprises:

obtaining the instructions on how to complete the connection request to a second phone number based on the first telephone number and a geographic location of the UE.

13. The method of claim 7, wherein the sending the request to the second wireless telecommunication network includes:

based on the unique identifier of the second wireless telecommunication network, sending the request to the second wireless telecommunication network for a unique address of a database associated with the second wireless telecommunication network including a location of a cell site communicating directly with the UE.

14. The method of claim 7, wherein the obtaining of the instructions on how to complete the connection request comprises:

obtaining a location of the UE or a location of a cell site communicating directly with the UE.

15. The method of claim 7, wherein the sending the request to the second wireless telecommunication network further includes:

sending the request by a first network repository function (NRF) associated with the first wireless telecommunication network to a second NRF associated with the second wireless telecommunication network.

16. A system comprising:

one or more processors;

memory coupled to the one or more processors, wherein the memory includes instructions executable by the one or more processors to:

receive from a user equipment (UE) belonging to a first wireless telecommunication network an indication of a call to a first telephone number, wherein the call requires information associated with the UE that is not available to the first wireless telecommunication network, wherein the call is placed by the UE roaming on a second wireless telecommunication network, wherein the indication of the call includes a unique identifier associated with the second wireless telecommunication network, and wherein the first wireless telecommunication network and the second wireless telecommunication network are 5G or higher;

determine based on the unique identifier that the UE is roaming;

send a request to the second wireless telecommunication network to provide instructions on how to route the call;

obtain the instructions on how to route the call; and based on the instructions, route the call.

17. The system of claim 16, wherein the call requires information about a location of the UE to be completed.

18. The system of claim 16, comprising:

the instructions to send the request to the second wireless telecommunication network comprising the instructions to:

send a first request to the second wireless telecommunication network for a unique address of a node in the second wireless telecommunication network configured to provide the instructions on how to route the call;

send a second request to the node having the unique address to provide a routable number based on the first telephone number;

obtain the routable number; and call the routable number.

19. The system of claim 16, wherein the instructions on how to route the call include a location of the UE or a location of a cell site communicating directly with the UE.

20. The system of claim 16, the instructions to send the request to the second wireless telecommunication network comprising the instructions to:

send the request by a first network repository function (NRF) associated with the first wireless telecommunication network to a second NRF associated with the second wireless telecommunication network.

* * * * *